O. BODLAK.
BERRY PICKING DEVICE.
APPLICATION FILED APR. 27, 1918.
1,316,265.
Patented Sept. 16, 1919.
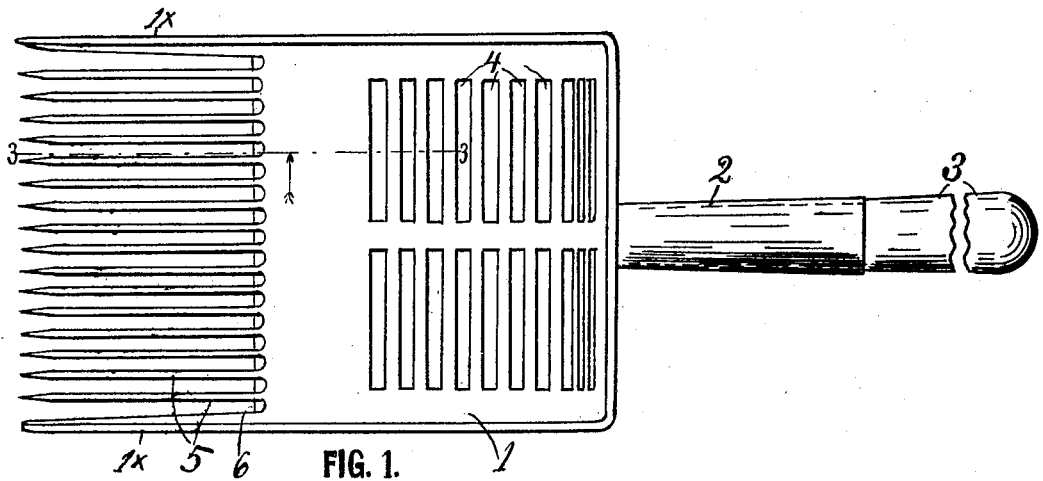
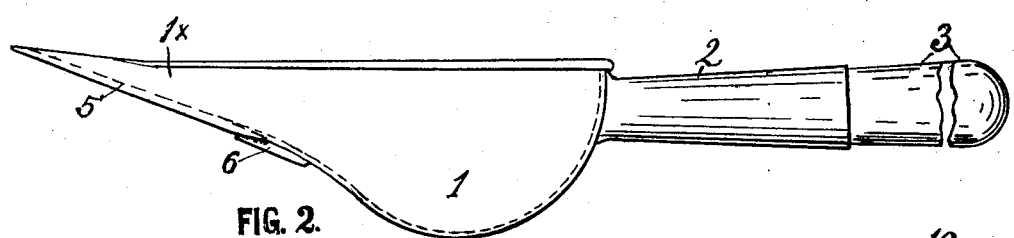
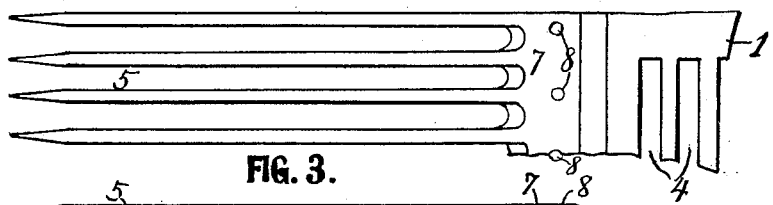
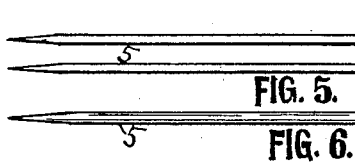
INVENTOR:
Oldrich Bodlak.
BY his ATTORNEY:
A. M. Carlsen.

UNITED STATES PATENT OFFICE.

OLDRICH BODLAK, OF ST. PAUL, MINNESOTA.

BERRY-PICKING DEVICE.

1,316,265.   Specification of Letters Patent.   Patented Sept. 16, 1919.

Application filed April 27, 1918. Serial No. 231,271.

*To all whom it may concern:*

Be it known that I, OLDRICH BODLAK, a citizen of the United States, residing at St. Paul, in the county of Ramsey and State of Minnesota, have invented a new and useful Berry-Picking Device, of which the following is a specification.

My invention relates to devices for picking berries, and the main object is to provide a handy and efficient device by which various kinds of berries and small fruit, but especially blue-berries, may be picked and cleaned much faster than by the usual process of picking them by hand.

In the accompanying drawing—

Figure 1 is a top or plan view of my improved berry picking device. Fig. 2 is a side view of the device. Fig. 3 is an enlarged and modified portion of Fig. 1 between the line 3—3 and the upper edge of said view. Fig. 4 is the lower edge of what is shown in Fig. 3. Fig. 5 is a fragmentary top view showing a modification in the method of securing the picking fingers. Fig. 6 is a lower edge view of Fig. 5 with the fingers secured. Fig. 7 is similar to Fig. 6 but showing another way of securing the tines or fingers. Fig. 8 is similar to Figs. 6 and 7 and shows still another way of securing the fingers to the scoop portion of the device.

Referring to the drawing by reference numerals, 1 designates the body of the device and consists of a scoop preferably made of sheet metal and provided at its rear edge with a hollow handle 2, in which may be inserted a much longer wooden handle 3. The bottom of the scoop is provided with a series of transversely disposed slots 4, and the front edge of it is raised somewhat and provided with a fork or comb composed of a series of tines or fingers 5, having fairly sharp pointed front ends but are otherwise preferably of round form and arranged in parallel position, and at each side of said fork the sides of the scoop are extended forwardly as guards 1$^x$.

In the manufacture of the device the tines may be formed in any suitable manner. Thus in Fig. 1 they appear as made integral with the body 1, while in Fig. 2 they are shown as secured in a transverse bottom strip or bar 6. In Figs. 3 and 4 is shown how the tines may be formed on a special plate 7 and the latter secured to the scoop by rivets 8. In Figs. 5 and 6 is shown how the front end of the scoop may be provided with spaced grooves 9 in which wire fingers 5 may be secured by solder 9$^x$. In Fig. 7 is shown how the front edge of the scoop may be secured by solder or other means in slits 10 in the rear ends of each finger 5. And in Fig. 8 is shown how the rear end of each finger 5 may be bent at right angles downward and secured in a hole 11 in the rear end of a groove 12 stamped or otherwise provided in the body of the scoop. The latter form I consider the most practical and inexpensive to manufacture.

In the operation or use of the device the handle 2 is grasped in one hand and a pail or other receptacle carried in the other hand, and in picking the berries, say blue berries, the device is pushed along below the berries and by such forward and upward movement the berries that are too large to escape downward between the fingers 5 become loosened and moved rearwardly into the scoop until the latter is fairly full, when it is emptied into the pail and the operation is repeated.

Where the berries are richly grown and the field is large, the pail or other receptacle (not shown) is placed on the ground and the device, which may then be of an extra large size, is given a long wooden handle 3, so the operator can use both hands on it and can walk along without stooping and push the device along like a pitch-fork and empty it into the receptacle, and moving the latter occasionally to a new part of the field.

It is obvious that the device may be used also for picking cherries and many other kinds of berries and fruits; and that during the operation, especially on a blueberry field, an occasional shaking or reciprocal movement of the device will cause leaves and undesirably small berries to escape downward through the apertures, 4, and thus the berries will be found practically cleaned at the time they are picked; the device thus saving much time and labor by picking the berries very fast and entirely avoiding the process of picking them over to clean them.

What I claim is:

1. In a berry picking device of the class described, a scoop-shaped body with a handle at its rear end and a series of parallel longitudinal grooves in the front end portion of its bottom, each of said grooves having in its rear-ward end a perforation, a series of pointed fingers or tines placed with their rear portions in said grooves and having each an angular bent end-portion inserted downwardly through the aperture and firmly secured therein.

2. The structure specified in claim 1, said angularly bent portions being upset or clenched at the underside of the bottom of the scoop.

In testimony whereof I affix my signature.

OLDRICH BODLAK.

Copies of this patent may be obtained for five cents each, by addressing the "Commissioner of Patents, Washington, D. C."